UNITED STATES PATENT OFFICE.

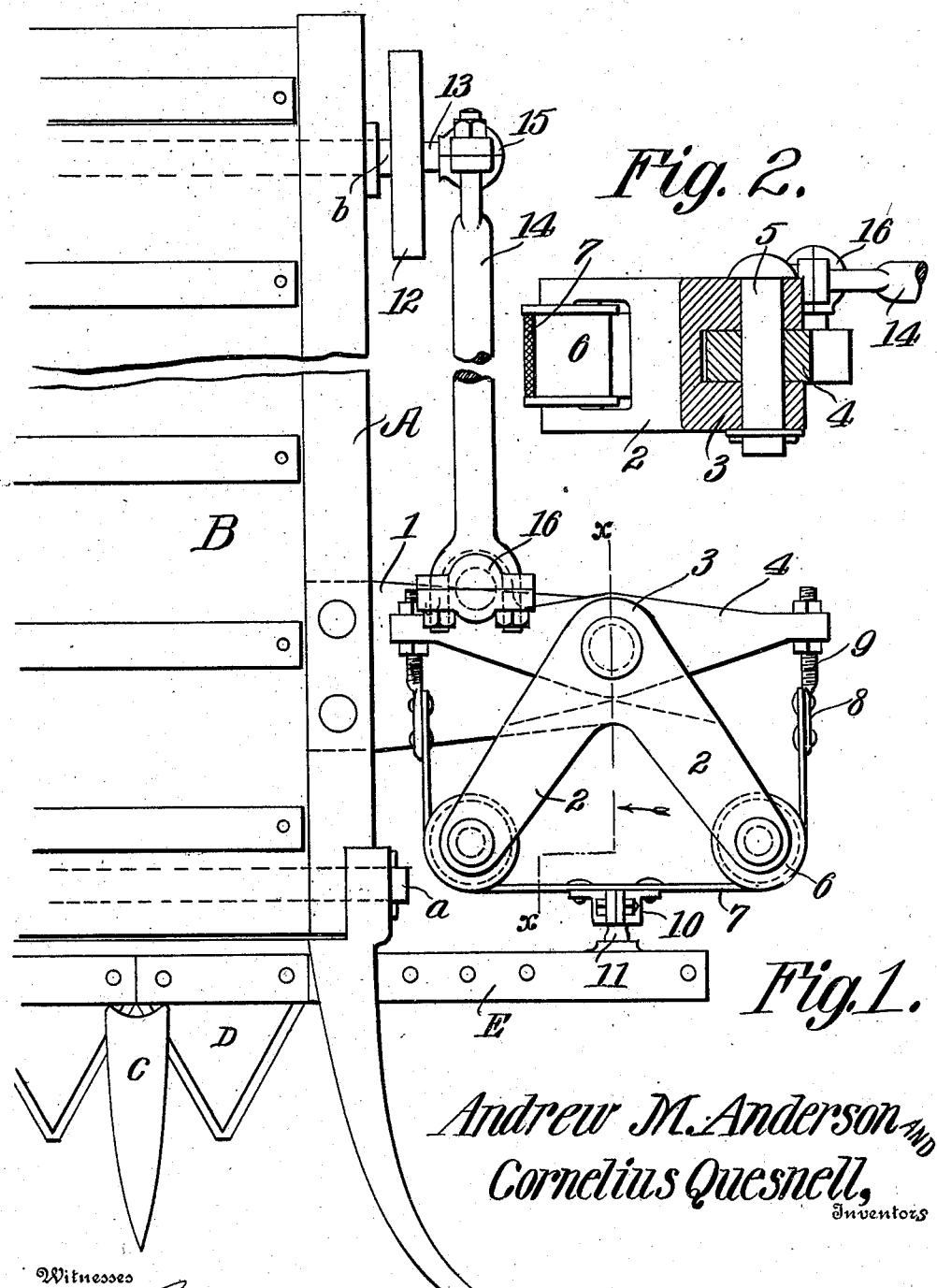

ANDREW M. ANDERSON AND CORNELIUS QUESNELL, OF MOSCOW, IDAHO, ASSIGNORS TO IDAHO NATIONAL HARVESTER COMPANY, OF MOSCOW, IDAHO.

PITMAN-DRIVE.

No. 920,000.      Specification of Letters Patent.      Patented April 27, 1909.

Application filed May 7, 1908. Serial No. 431,450.

*To all whom it may concern:*

Be it known that we, ANDREW M. ANDERSON and CORNELIUS QUESNELL, citizens of the United States, residing at Moscow, in the county of Latah and State of Idaho, have invented a new and useful Pitman-Drive, of which the following is a specification.

This invention relates to machines for harvesting grain and more particularly to mechanism for driving the sickle bar.

The object of the invention is to provide mechanism of this character which reduces to the minimum the jar and noise usually produced by the reciprocation of the sickle bar and the operation of its parts.

Another object is to provide mechanism of this character particularly designed for use in connection with an adjustable or shiftable cutter bar such as described and claimed in a co-pending application executed and filed by us.

A further object is to provide driving mechanism which exerts a pull in both directions upon the sickle bar and is thus more effective than similar mechanism which exerts a pushing and pulling action upon the bar as heretofore.

With these and other objects in view the invention consists of certain novel features of construction and combinations of parts which will be hereinafter more fully described and pointed out in the claims.

In the accompanying drawings is shown the preferred form of the invention.

In said drawings: Figure 1 is a plan view of a portion of a harvester with our improved mechanism applied thereto. Fig. 2 in a section on line X—X, Fig. 1.

Referring to the figures by characters of reference, A designates a frame on which the draper or endless apron B is mounted, there being a finger bar C pivotally connected to the front portion of the frame A preferably in the manner described in a co-pending application filed by us. One of the pivotal connections between the frame A and the finger bar C has been indicated at $a$. The sickle bar D is mounted upon the finger bar C to reciprocate in the usual manner, and has an arm E extending from one end of the sickle bar to the driving mechanism constituting the present invention.

Extending laterally from the frame A is a bracket 1 having forwardly diverging arms 2 extending therefrom, the rear or angle portion 3 of the bracket being slotted transversely to receive a walking beam 4 mounted on a suitable pivot 5. The forward ends of the arms 2 have grooved wheels 6 journaled therein and constituting guides for a flexible strap or belt 7, the ends of which are connected to the ends of the walking beam in any preferred manner. In the drawings plates 8 have been riveted or otherwise fastened to the ends of the belt and provided with screw threaded stems 9 extending through the ends of the walking beam, and held in adjusted positions therein by means of nuts or the like. The socket member 10 of a ball and socket joint of any preferred construction is riveted or otherwise secured to the middle portion of the belt and the other member 11 of said joint is secured to the arm E and extends rearwardly therefrom.

Arranged upon the upper shaft $b$ of the draper B is a drive wheel 12 on the wrist pin 13 of which is mounted one end of a pitman 14, there being preferably a ball and socket connection 15 between the pitman and the wrist pin. The other or forward end of the pitman is connected by a suitable universal joint 16 with one end portion of the walking beam 4. It is of course to be understood that when the machine is moving forward the shaft $b$ will be driven by means of any suitable mechanism, not shown, and motion will be transmitted therefrom to the walking beam 4 through wrist pin 13 and pitman 14. The oscillation of the walking beam will cause the belt 17 to move in the direction of its length and to pull alternately in opposite directions upon the joint 10—11 and cause the sickle bar D and its arm E to reciprocate. This movement will be produced practically without noise or vibration because of the flexible driving connection between the walking beam and the arm E, that portion of the belt 7 to which the connection 10—11 is fastened being movable in a line parallel with the direction of movement of the sickle bar. Inasmuch as this driving mechanism is designed for use in connection with a vertically swinging cutter bar it will be apparent that any change of position of the cutter bar produced by swinging it upon its pivot a will not affect the operation of the parts because of the use of the ball and socket connection 10—11 and of the fact that the belt 7 is flexible and capable of bending transversely to any desired extent. By providing the threaded stems 9 the belt 7 can be adjusted longitudinally so as to bring the connection 10—11 at any desired point between the wheels 6 when at the middle or ends of its strokes. Importance is attached to the fact that this mechanism operates to pull upon the sickle bar during both strokes thereof, thus doing away with the push and pull movements ordinarily utilized.

What is claimed is:

1. The combination with a reciprocating sickle bar; of drive mechanism therefor comprising a flexible power transmitting device, a connection between said device and the sickle bar, and means for reciprocating a portion of said device and the connection along lines parallel with the direction of movement of the sickle bar.

2. The combination with a longitudinally movable sickle bar; of driving mechanism therefor comprising a walking beam, a flexible power transmitting device connected to and reciprocated by the walking beam, guides for said flexible device and a connection between said device and the sickle bar.

3. The combination with a longitudinally movable sickle bar; of driving mechanism therefor comprising a flexible power transmitting device, a connection between said device and the sickle bar, a portion of said device being movable parallel with the sickle bar, and mechanism for reciprocating said flexible device.

4. The combination with a longitudinally movable sickle bar; of driving mechanism therefor comprising a walking beam, a flexible power transmitting device connected to and actuated by the walking beam, guides for said device, a jointed connection between said device and the sickle bar, and means for actuating the walking beam to reciprocate a portion of said device in a plane parallel with the direction of movement of the sickle bar.

5. The combination with a longitudinally movable sickle bar; of a walking beam, relatively fixed guide wheels, a flexible device connected to the end portions of the walking beam and mounted upon the wheels, that portion of said device between the wheels being parallel with the direction of movement of the sickle bar, a connection between the sickle bar and the parallel portion of the flexible device, and means for actuating the walking beam.

6. The combination with a relatively movable sickle bar; of a walking beam, a flexible power transmitting device connected to and reciprocated by the walking beam, a connection between said device and the sickle bar, and means for actuating the walking beam.

7. The combination with a longitudinally movable sickle bar; of a flexible power transmitting device movable parallel with the direction of movement of the sickle bar, a connection between said device and the sickle bar, and means for reciprocating said device.

8. The combination with a longitudinally movable sickle bar; of a flexible power transmitting device movable parallel with the direction of movement of the sickle bar, a connection between said device and the sickle bar, and a walking beam connected to and disposed to reciprocate said device.

9. The combination with a longitudinally movable sickle bar; of a flexible power transmitting device movable parallel with the direction of movement of the sickle bar, a connection between said device and the sickle bar, a walking beam connected to said device, and means for oscillating the walking beam to reciprocate said devices.

10. The combination with a longitudinally movable sickle bar; of a flexible power transmitting device movable parallel with the direction of movement of the sickle bar, a connection between said device and the sickle bar, spaced guides for said device, a revoluble drive device, and mechanism operated by said revoluble device for reciprocating the flexible power transmitting device.

11. The combination with a conveyer carrying frame and a finger bar pivotally mounted upon said frame, and a longitudinally movable sickle bar; of a bracket carried by the frame, spaced guide wheels supported by the bracket, a walking beam, a flexible belt secured at its ends to said walking beam and mounted upon the wheels, a connection between said belt and the sickle bar, and means for actuating the walking beam to reciprocate the belt.

In testimony that we claim the foregoing as our own, we have hereto affixed our signatures in the presence of two witnesses.

ANDREW M. ANDERSON.
CORNELIUS QUESNELL.

Witnesses:
J. M. THOMPSON,
G. P. MIX.